(12) United States Patent
Farrand et al.

(10) Patent No.: US 7,115,755 B2
(45) Date of Patent: Oct. 3, 2006

(54) REACTIVE MESOGENIC AZULENES

(75) Inventors: Louise Diane Farrand, Spetisbury (DE); Michael Findlater, Glasgow (GB); Mark Giles, Southampton (GB); Martin Heeney, Southampton (GB); Steven Tierney, Southampton (GB); Marcus Thompson, Fordingbridge (GB); Maxim Shkunov, Southampton (GB); David Sparrowe, Southbourne (GB); Iain McCulloch, Kings Somborne (GB)

(73) Assignee: Merck Patent GmbH, Darmstadt (DE)

( * ) Notice: Subject to any disclaimer, the term of this patent is extended or adjusted under 35 U.S.C. 154(b) by 213 days.

(21) Appl. No.: 10/314,162

(22) Filed: Dec. 9, 2002

(65) Prior Publication Data

US 2003/0168657 A1 Sep. 11, 2003

(30) Foreign Application Priority Data

Dec. 10, 2001 (EP) .................................. 01129217

(51) Int. Cl.
*C07D 333/02* (2006.01)

(52) U.S. Cl. .................. 549/29; 549/510; 549/512; 558/300; 257/79

(58) Field of Classification Search .................. 549/29
See application file for complete search history.

(56) References Cited

U.S. PATENT DOCUMENTS

| 4,738,908 A | 4/1988 | Oguchi et al. |
| 5,037,575 A | 8/1991 | Miura et al. |
| 6,138,225 A | 10/2000 | Meyer et al. |
| 2004/0164272 A1 | 8/2004 | Buchecker et al. |

FOREIGN PATENT DOCUMENTS

| EP | 0 187 015 | 7/1986 |
| EP | 1 256 602 | 11/2002 |
| WO | WO 97 00600 | 1/1997 |

OTHER PUBLICATIONS

Wada et al., "Synthesis and Polymerization of Acrylates Containing Azulene Structure," *Journal of Polymer Science: Polymer Chemistry Edition*, vol. 16, 1978, pp. 2085-2087.
European International Search Report dated Mar. 10, 2003.
Patent Abstract of Japan No. 02-069441 dated Mar. 8, 1990.
Patent Abstract of Japan No. 02-069437 dated May 29, 1990.
Patent Abstract of Japan No. 03-122189 dated May 24, 1991.
Patent Abstract of Japan No. 02-069439 dated Mar. 8, 1990.
Patent Abstract of Japan No. 02-069438 dated Mar. 8, 1990.
Patent Abstract of Japan No. 60-104180 dated Jun. 8, 1985.
S.E. Estdale et al., "The Azulene Ring as a 1-10 Structural Element in Liquid Crystals", Journal of Materials Chemistry, vol. 7, No. 3, (1997), pp. 391-401.

*Primary Examiner*—Kamal A. Saeed
(74) *Attorney, Agent, or Firm*—Miller, White, Zelano & Branigan, P.C.

(57) ABSTRACT

The invention relates to new reactive mesogenic azulene derivatives, their use as semiconductors or charge transport materials, in optical, electro-optical or electronic devices like for example liquid crystal displays, optical films, organic field effect transistors (FET or OFET) for thin film transistor liquid crystal displays and integrated circuit devices such as RFID tags, electroluminescent devices in flat panel displays, and in photovoltaic and sensor devices, and to a field effect transistor, light emitting device or ID tag comprising the reactive mesogenic azulenes.

7 Claims, No Drawings

REACTIVE MESOGENIC AZULENES

FIELD OF INVENTION

The invention relates to new reactive mesogenic azulene derivatives. The invention further relates to their use as semiconductors or charge transport materials, for example, in optical, electro-optical or electronic devices like for example liquid crystal displays, optical films, organic field effect transistors (FET or OFET) for thin film transistor liquid crystal displays and integrated circuit devices such as RFID tags, electroluminescent devices in flat panel displays, and in photovoltaic and sensor devices. The invention further relates to a field effect transistor, light emitting device or ID tag comprising the reactive mesogenic azulenes.

BACKGROUND OF THE INVENTION

Organic materials have recently shown promise as the active layer in organic based thin film transistors and organic field effect transistors [see H. E. Katz, Z. Bao and S. L. Gilat, *Acc. Chem. Res.*, 2001, 34, 5, 359]. Such devices have potential applications in smart cards, security tags and the switching element in flat panel displays. Organic materials are envisaged to have substantial cost advantages over their silicon analogues if they can be deposited from solution, as this enables a fast, large-area fabrication route.

The performance of the device is principally based upon the charge carrier mobility of the semi-conducting material and the current on/off ratio, so the ideal semiconductor should have a low conductivity in the off state, combined with a high charge carrier mobility ($>1 \times 10^{-3}$ cm$^2$V$^{-1}$s$^{-1}$). In addition, it is important that the semi-conducting material is relatively stable to oxidation, i.e. it has a high ionization potential, as oxidation leads to reduced device performance.

A known compound which has been shown to be an effective p-type semiconductor for OFETs is pentacene [see S. F. Nelson, Y. Y. Lin, D. J. Gundlach and T. N. Jackson, *Appl. Phys. Lett.*, 1998, 72, 1854]. When deposited as a thin film by vacuum deposition, it was shown to have carrier mobilities in excess of 1 cm$^2$ V$^{-1}$ s$^{-1}$ with very high current on/off ratios greater than 10$^6$. However, vacuum deposition is an expensive processing technique that is unsuitable for the fabrication of large-area films.

Regular poly(3-hexylthiophene) has been reported with charge carrier mobility between $1 \times 10^{-5}$ and $4.5 \times 10^{-2}$ cm$^2$ V$^{-1}$ s$^{-1}$, but with a rather low current on/off ratio between 10 and 10$^3$ [see Z. Bao et al., *Appl. Phys. Lett.* 1997, 78, 2184]. In general, poly(3-alkylthiophenes) show improved solubility and are able to be solution processed to fabricate large area films. However, poly(3-alkylthiophenes) have relatively low ionisation potentials and are susceptible to doping in air [see H. Sirringhaus et al., *Adv. Solid State Phys.* 1999, 39, 101].

SUMMARY OF THE INVENTION

It was an aim of the present invention to provide new organic materials for use as semiconductors or charge transport materials, which are easy to synthesize, have high charge mobility and good processability. The materials should be easily processable to form thin and large-area films for use in semiconductor devices. Other aims of the invention are immediately evident to those skilled in the art from the following description.

It was found that the above aims can be achieved by providing reactive mesogenic azulene compounds, also referred to as reactive azulene mesogens, according to the present invention as described below. They consist of a central mesogenic core comprising one or more azulene groups, and optionally comprising further unsaturated organic groups that form a conjugated system together with the azulene groups, said mesogenic core being linked, optionally via a spacer group, to one or more polymerizable groups. The reactive mesogenic azulenes can induce or enhance liquid crystal phases or are liquid crystalline themselves. They can be oriented in their mesophase and the polymerizable group can be polymerized or crosslinked in situ to form polymer films with a high degree of order, thus yielding improved semiconductor materials with high stability and high charge carrier mobility.

Grell et al., *J. Korean Phys. Soc.* 2000, 36(6), 331 suggest a reactive mesogen comprising a conjugated distyrylbenzene core with two reactive acrylate end groups as a model compound for molecular electronics. However, there is no disclosure of reactive mesogens of azulene.

Non-reactive, low molar mass azulene derivatives for use as components of liquid crystal compositions are shown for example in JP-A-02-069437, JP-A-02-069441 and JP-A-03-122189. The synthesis and polymerization of an acrylate with an azulene group is described in Wada et al., J. Polym. Sci., Polym. Chem. Ed. 1978,16(8), 2085. The azulenes and polymers produced by Wada are excluded from this invention.

A further aspect of the invention relates to liquid crystal polymers, in particular liquid crystal side chain polymers obtained from the azulene reactive mesogens according to the present invention, which are then further processed e.g. from solution as thin layers for use in semiconductor devices.

DEFINITION OF TERMS

The terms 'liquid crystalline or mesogenic material' or 'liquid crystalline or mesogenic compound' mean materials or compounds comprising one or more rod-shaped, lath-shaped or disk-shaped mesogenic groups, i.e. groups with the ability to induce liquid crystal phase behavior. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

The term 'reactive group' or 'reactive compound' includes compounds or groups that are capable of participating in a polymerization reaction, like radicalic or ionic chain polymerization, polyaddition or polycondensation, as well as compounds or groups that are capable of being grafted for example by condensation or addition to a polymer backbone in a polymeranaloguous reaction.

The term 'film' includes self-supporting, i.e. free-standing, films that show more or less pronounced mechanical stability and flexibility, as well as coatings or layers on a supporting substrate or between two substrates.

DETAILED DESCRIPTION OF THE INVENTION

One object of the invention is reactive mesogenic azulenes, consisting of a central mesogenic core comprising one or more azulene groups, and optionally comprising further unsaturated organic groups that form a conjugated system together with the azulene groups, said mesogenic core being linked, optionally via spacer groups, to one or more reactive groups.

Another object of the invention is the use of reactive mesogenic azulenes as semiconductors or charge transport materials, in particular in optical, electro-optical or electronic devices, like for example in field effect transistors as components of integrated circuitry, as thin film transistors in flat panel display applications or RFID tags, or in semiconducting components for organic light emitting diode (OLED) applications such as electroluminescent displays or backlights of flat panel displays, for photovoltaic or sensor devices, or as light-modulating components for liquid crystal displays, optical films or other optical or electrooptical devices.

Another object of the invention is a field effect transistor, for example as a component of integrated circuitry, as a thin film transistor in flat panel display applications, or in an RFID tag, comprising one or more reactive or polymerized mesogenic azulenes according to the present invention.

Another object of the invention is a semi-conducting component, for example in OLED applications like electroluminescent displays or backlights of flat panel displays, in photovoltaic or sensor devices, comprising one or more reactive or polymerized mesogenic azulenes according to the present invention.

The reactive azulenes according to the present invention provide several advantages over prior art materials

- by adding substituent chains and other groups to the azulene core they can be made more soluble, thus being suitable for spin coating or solution coating techniques, rather than vacuum deposition, to prepare thin films for use, e.g., in electronic devices such as transistors,
- they can be made mesogenic or liquid crystalline, thus exhibiting a higher degree of order that leads to particularly high charge carrier mobility, in particular when being aligned in their mesophase into macroscopically ordered orientation
- their macroscopic mesophase properties can be frozen in by in situ polymerization,
- they combine the properties of a semi-conducting material with those of a mesogenic material to give novel materials with a rigid, planar conjugated core and a flexible chain to increase solubility and to decrease the melting point, which show high charge carrier mobility when being aligned in their mesophase.

The inventive reactive mesogenic azulenes are useful as charge transport semiconductors, in that they have high carrier mobilities. In particular, the introduction of side groups to the conjugated rings bonded to the azulene core improves their solubility and therefore their solution processability. In the compounds according to the present invention, the azulene group is a mesogenic group or part of a mesogenic group. These compounds are therefore particularly useful as semiconductors or charge transport materials, as they can be processed while in the highly ordered mesophase morphology, and readily aligned by conventional techniques in a preferred direction. Both smectic and nematic mesophase ordering allows close packing of molecular pi-electron systems, which maximizes intermolecular charge transfer which occurs through a hopping mechanism between adjacent molecules. This ordered, and oriented microstructure can be permanently "frozen-in" by polymerizing the mesogens, which can also create a structure with long range order, or "monodomain." Formation of a monodomain also maximizes charge transfer by eliminating charge trap sites at grain boundaries, while the polymerization also improves the mechanical properties of the film. Further, by cross-linking the mesogens, a highly stable structure results, which has an additional advantage of being impervious to subsequent processing solvents during device fabrication, thus allowing a wider range of solvents to be used in deposition of the next layer of the device by solution techniques. In addition, it is often observed that this cross-linking further densifies the film, leading to smaller intermolecular distances and improved charge transport.

It is also possible to co-polymerize azulenes of the present invention with other mesogenic or liquid crystal monomers that are known from prior art, or with other reactive azulenes of the present invention, in order to induce or enhance liquid crystal phase behavior.

Thus, another object of the invention is a polymerizable liquid crystal mixture comprising one or more reactive azulenes of the present invention, and optionally comprising one or more further reactive compounds, wherein at least one of the reactive azulenes and the further reactive compounds is mesogenic or liquid crystalline.

Particularly preferred are reactive liquid crystal azulenes of the present invention, or liquid crystal mixtures comprising one or more reactive azulenes of the present invention, that exhibit a nematic and/or smectic liquid crystal phase.

Another object of the present invention is an anisotropic polymer film with charge transport properties obtainable from a polymerizable liquid crystal mixture as defined above that is aligned in its liquid crystal phase into macroscopically ordered orientation and polymerized or cross-linked to fix the oriented state.

Another object of the invention is a liquid crystal side chain polymer (SCLCP) obtained from a polymerizable liquid crystal material as defined above by polymerization or polymeranaloguous reaction. Particularly preferred are SCLCPs obtained from one or more reactive azulenes or from a polymerizable mixture comprising one or more azulenes as described above.

Another object of the invention is an SCLCP obtained from one or more reactive azulenes or from a polymerizable liquid crystal mixture as defined above, by copolymerization or polymeranaloguous reaction together with one or more additional mesogenic or non-mesogenic comonomers.

Side chain liquid crystal polymers or copolymers (SCLCPs), in which the semiconducting component is located as a pendant group, separated from a flexible backbone by an aliphatic spacer group, offer the possibility to obtain a highly ordered lamellar like morphology. This structure consists of closely packed conjugated aromatic mesogens, in which very close (typically <4 Å) pi-pi stacking can occur. This stacking allows intermolecular charge transport to occur more easily, leading to high charge carrier mobilities. SCLCPs are advantageous for specific applications as they can be readily synthesized before processing and then, e.g., be processed from solution in an organic solvent. If SCLCPs are used in solutions, they can orient spontaneously when coated onto an appropriate surface and when at their mesophase temperature, which can result in large area, highly ordered domains.

Another object of the invention is the use of reactive mesogenic azulenes of the present invention, or liquid crystal mixtures or polymer films obtained thereof, as light-modulating component in liquid crystal displays, which may for example be switchable between two different states by an electric field, for components of liquid crystal displays, in particular optical retardation or compensation films, alignment layers or polarizers, or in other optical or electrooptical devices.

Another object of the invention is a liquid crystal display, component of a liquid crystal display, in particular an optical retardation or compensation films, alignment layer or polarizer, or an other optical or electrooptical device comprising reactive azulenes according to the present invention, or liquid crystal mixtures or polymer films obtained thereof.

The azulene groups in the inventive compounds are preferably linked to their neighbouring groups at the 2- and 6-position.

Especially preferred are compounds selected of formula I

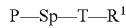     I wherein

| P | is a polymerizable or reactive group, |
|---|---|
| Sp | is a spacer group or a single bond, |
| $R^1$ | is H, halogen, CN, $NO_2$, an aliphatic, alicyclic or aromatic group with up to 40 C atoms that optionally comprise one or more hetero atoms and one or more fused rings, or P—Sp—, and |
| T | is a mesogenic group comprising one or more azulene groups that are optionally substituted and optionally comprise fused azulene groups, with the proviso that azulene groups linked to their neighboured groups at the 1- and 3-position are excluded. |

$R^1$ in formula I is preferably H, F, Cl or straight chain, branched or cyclic alkyl with 1 to 20 C-atoms, which is unsubstituted, mono- or poly-substituted by F, Cl, Br, I or CN, wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —CH=CH— or —C≡C— in such a manner that O and/or S atoms are not linked directly to one another, or an aromatic or heteroaromatic group.

Particularly preferably $R^1$ is optionally fluorinated alkyl or alkoxy with 1 to 15 C atoms.

Further preferred are compounds of formula I wherein $R^1$ is P—Sp.

T in formula I preferably comprises 1 or 2 azulene groups.

Particularly preferably T is selected of formula II

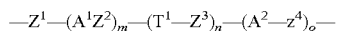     II wherein

| $A^1$ and $A^2$ | are independently of each other an aromatic, heteroaromatic, group with up to 18 C atoms which is unsubstituted, mono- or polysubstituted with $R^1$, and $A^1$ may also denote $T^1$, |
|---|---|
| $Z^1$ to $Z^4$ | are independently of each other —O—, —S—, —CO—, —COO—, —OCO—, —O—COO—, —CO—$NR^0$—, —$NR^0$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^0$—, —$CX^1$=$CX^2$—, —C≡C—, —CH=CH—COO—, —OCO—CH=CH— or a single bond, |
| $X^1$ and $X^2$ | are independently of each other H, F, Cl or CN, |
| $T^1$ | is a group consisting of 1, 2, 3, or 4 azulene units which are optionally substituted by $R^2$, |
| $R^2$ | is H, halogen, CN, $NO_2$, straight chain, branched or cyclic alkyl with 1 to 20 C-atoms, which is unsubstituted, mono- or poly-substituted by F, Cl, Br, I or CN, wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —CH=CH— or —C≡C— in such a manner that O and/or S atoms are not linked directly to one another, or denotes an aromatic or heteroaromatic group or P—Sp, |
| $R^0$ and $R^{00}$ | are independently of each other H or alkyl with 1 to 12 C-atoms, |
| m and o | are independently of each other 0, 1, 2 or 3, and |
| n | is 1, 2 or 3 |

Particularly preferred groups T are those wherein $Z^1$, $A^1$, $Z^2$, $T^1$, $Z^3$, $A^2$ and $Z^4$ form a conjugated system. Therein $A^1$ and $A^2$ are preferably arylene or heteroarylene and $Z^1$, $Z^2$, $Z^3$ and $Z^4$ are preferably a single bond or a conjugated link such as —$CX^1$=$CX^2$— or —C≡C—.

Further preferred groups T are those wherein m and o are 0, further those wherein m and o are 1 or 2.

Further preferred groups T are those wherein $T^1$ is azulene that is optionally substituted with $R^2$ as defined in formula II, furthermore those wherein n is 1 or 2 and $Z^2$ is a single bond or a conjugated link such as —$CX^1$=$CX^2$— or —C≡C—.

Particularly preferred groups T are those of the following formulae

     II1

     II2

     II3

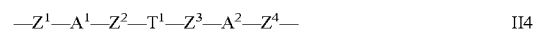     II4

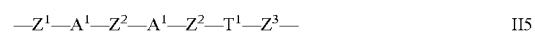     II5

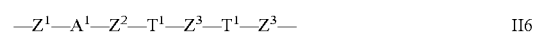     II6

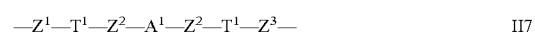     II7

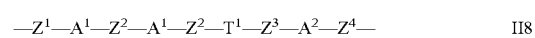     II8

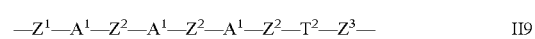     II9

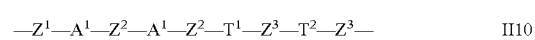     II10

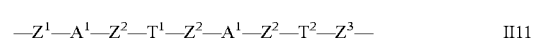     II11

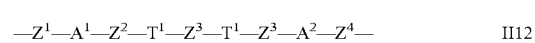     II12

     II13

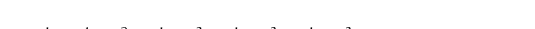     II14

     II15

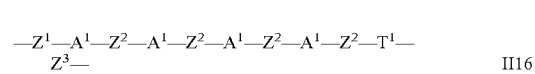     II16

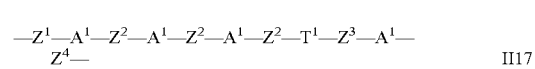     II17

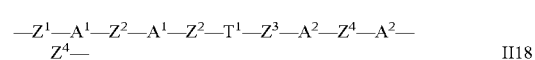     II18

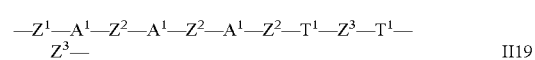     II19

—Z¹—A¹—Z²—A¹—Z²—T¹—Z²—A¹—Z²—T¹—Z³—  II20

—Z¹—A¹—Z²—T¹—Z²—A¹—Z²—A¹—Z²—T¹—Z³—  II21

—Z¹—A¹—Z²—A¹—Z²—T¹—Z³—T¹—Z³—A²—Z⁴—  II22

—Z¹—A¹—Z²—T¹—Z²—A¹—Z²—T¹—Z³—A²—Z⁴—  II23

—Z¹—T¹—Z²—A¹—Z²—A¹—Z²—A¹—Z²—T¹—Z³—  II24

—Z¹—A¹—Z²—A¹—Z²—T¹—Z³—T¹—Z³—T¹—Z³—  II25

—Z¹—A¹—Z²—T¹—Z²—A¹—Z²—T¹—Z³—T¹—Z³—  II26

—Z¹—A¹—Z²—T¹—Z²—T¹—Z²—A¹—Z²—T¹—Z³—  II27

—Z¹—A¹—Z²—T¹—Z³—T¹—Z³—T¹—Z³—A²—Z⁴—  II28

—Z¹—T¹—Z²—A¹—Z²—T¹—Z²—A¹—Z²—T¹—Z³—  II29

—Z¹—T¹—Z²—A¹—Z²—A¹—Z²—T¹—Z³—T¹—Z³—  II30 wherein $Z^1$, $Z^2$, $Z^3$, $Z^4$, $A^1$, $A^2$ and $T^1$ have in each case independently one of the meanings of formula II.

$T^1$ is preferably 2,6-azulene, furthermore [2,6']-bisazulene-6,2'-diyl, [2,2']-bisazulene-6,6'-diyl or [6,6']-bisazulene-2,2'-diyl, all of which are optionally mono- or polysubstituted by $R^2$ as defined in formula II.

$T^1$ is preferably selected from the following subformulae

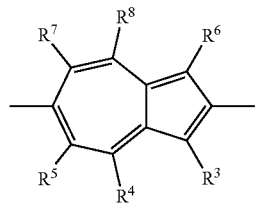

IIIa

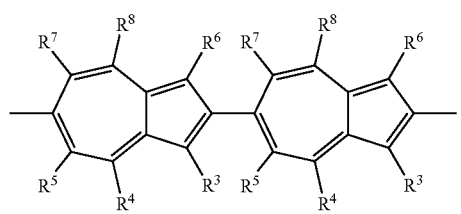

IIIb

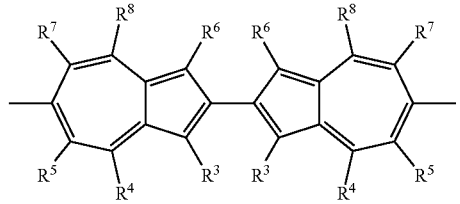

IIIc

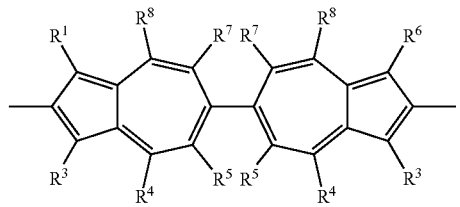

IIId wherein $R^3$ to $R^8$ have independently of each other one of the meanings of $R^1$ in formula II, and are preferably halogen, methyl, ethyl, propyl, $CO_2Me$, $CO_2Et$, CN, $COCH_3$ or CHO.

$A^1$ and $A^2$ are preferably selected from 1,4-phenylene, 1,4-cyclohexa-1,3-diene, 1,4-cyclohexenylene in which, in addition, one or more CH groups are optionally replaced by N and one or two non-adjacent $CH_2$ groups are optionally replaced by O and/or S, thiophene-2,5-diyl, thienothiophene-2,5-diyl, dithienothiophene-2,6-diyl, 1,4-bicyclo-(2,2,2)-octylene, naphthalene-2,6-diyl, furan-2,5-diyl, and indane-2,5-diyl, wherein these groups are unsubstituted, mono- or polysubstituted by L, with L being halogen, CN, SCN, $NO_2$, $SF_5$ or an alkyl, alkoxy, alkylcarbonyl or alkoxycarbonyl group with 1 to 4 C atoms, wherein one or more H atoms are optionally substituted with F or Cl.

$A^1$ and $A^2$ are particularly preferably 1,4-phenylene that is substituted with 1, 2 or 3 groups L as defined above, or thiophene-2,5-diyl, all of which are optionally substituted with one or more groups L as defined above.

$Z^{1-4}$ are preferably selected from —O—, —S—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH=N—, —N=CH—, —N=N—, —CH=CR⁰—, —CX¹=CX²—, —C≡C— and a single bond, in particular from —CH=N—, —N=CH—, —N=N—, —CH=CR⁰—, —CX¹=CX²—, —C≡C— and a single bond.

Particularly preferred are the following compounds
I1
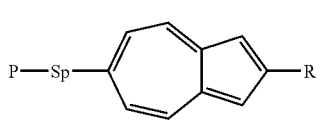
I2
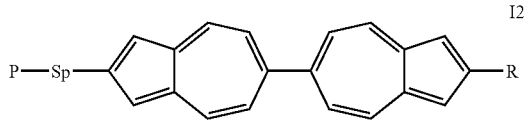
I3
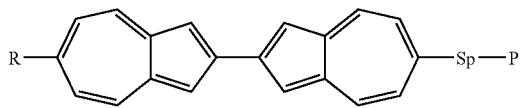
I4
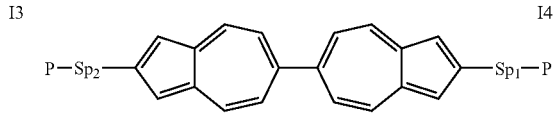
I5
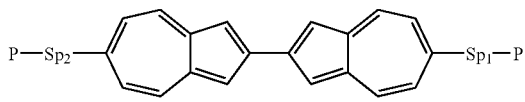
I6
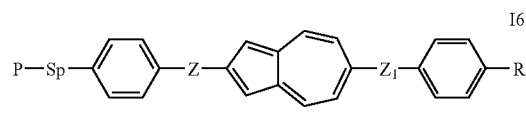
I7
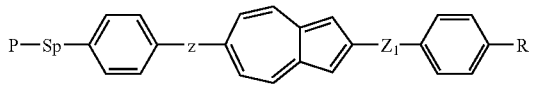
I8
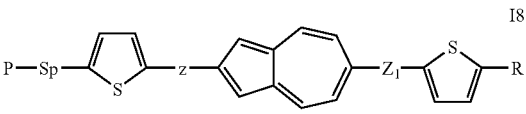
I9
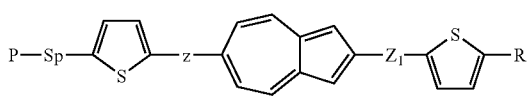
I10
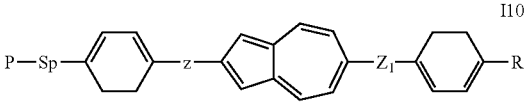
I11
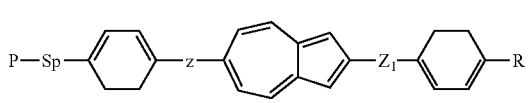
I12
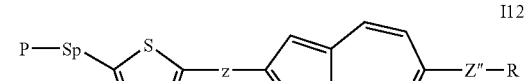
I13
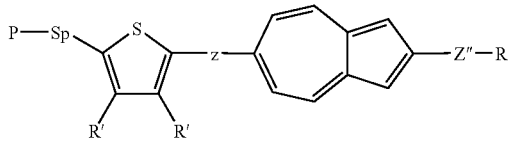
I14
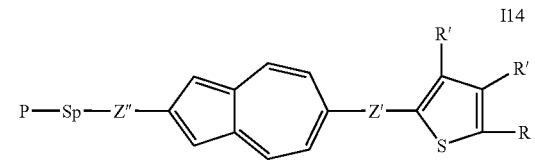
I15
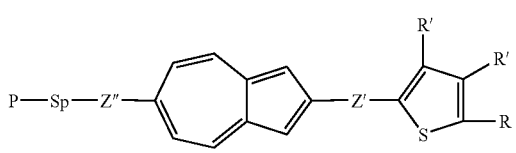
I16
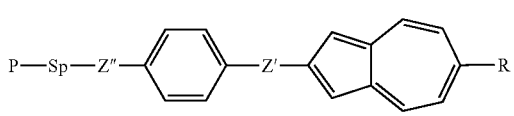
I17
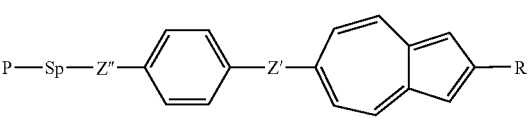
I18
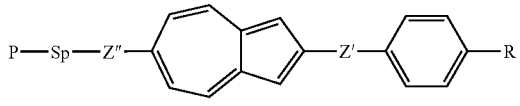
I19
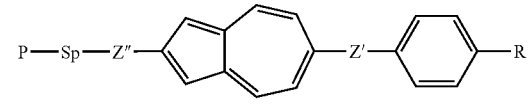
I20
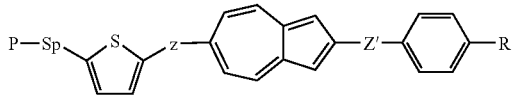
I21
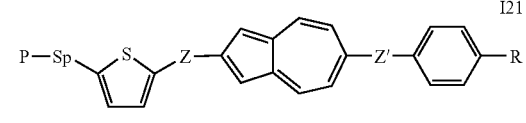
I22
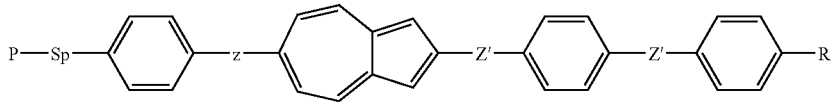

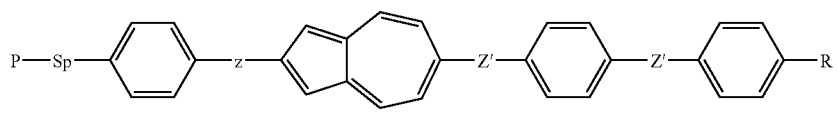

I23

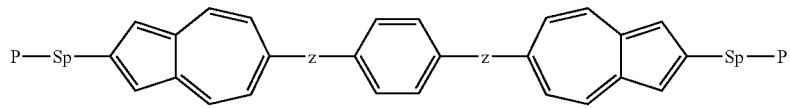

I24

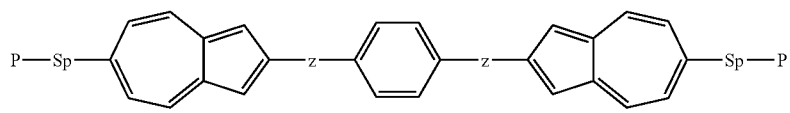

I25

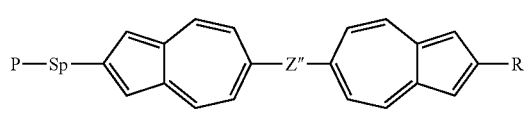

I26

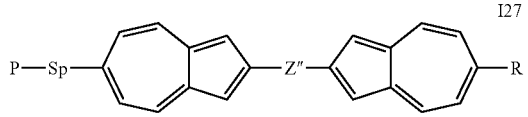

I27

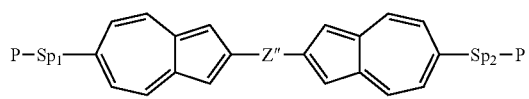

I28

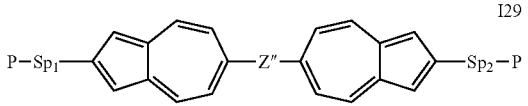

I29 wherein P, Sp and n have the meanings of formula I,

| | |
|---|---|
| Sp¹ and Sp² | are different groups Sp as defined in formula I, that is they are both selected from the groups Sp but Sp¹ and Sp² are not simultaneously the same, |
| Z and Z' | have independently of each other one of the meanings of Z¹ in formula II, and are preferably —CH=CH—, —CH=CF—, —CF=CH—, CH=CCl—, —CCl=CH—, —CF=CF—, —CCl=CCl—, —C≡C— or a single bond, |
| Z" | has one of the meanings of Z¹ in formula II, and is preferably —CH=CH—, —CH=CF—, —CF=CH—, CH=CCl—, —CCl=CH—, —CF=CF—, —CCl=CCl— or —C≡C—, |
| R | has in each case independently one of the meanings of R¹ of formula I, and is preferably halogen, an optionally fluorinated alkyl groups with 1 to 15 C atoms or P-Sp-, |
| R' | has in each case independently one of the meanings of R² in formula II, and is preferably halogen, an optionally fluorinated alkyl group with 1 to 15 C atoms or P—Sp—, | and wherein the azulene group is optionally mono-or polysubstituted by R² as defined in formula II.

Further preferred are compounds of the preferred formulae I6 to I29, wherein the azulene-2,6-diyl groups are replaced by [2,6']-bisazulene-6,2'-diyl, [2,2']-bisazulene-6,6'-diyl or [6,6']-bisazulene-2,2'-diyl, all of which are optionally mono- or polysubstituted by R² as defined in formula II.

In the foregoing and the following, arylene and heteroarylene preferably denote a bivalent mono-, bi- or tricyclic aromatic or heteroaromatic group with up to 15 C atoms that may also comprise fused rings and is optionally substituted with one or more groups selected from H, halogen, CN, NO$_2$, straight chain, branched or cyclic alkyl with 1 to 20 C-atoms, which is unsubstituted, mono- or poly-substituted by F, Cl, Br, I or CN, wherein one or more non-adjacent CH$_2$ groups are optionally replaced, in each case independently from one another, by —O—, —S—, —NH—, —NR°—, —SiR°R°°—, —CO—, —COO—, —OCO—, —OCO—O—, —S—CO—, —CO—S—, —CH=CH— or —C≡C— in such a manner that O and/or S atoms are not linked directly to one another, and P—Sp as defined in formula I. Very preferred arylene and heteroarylene groups are those having one of the preferred meanings of A¹ as given above and below.

Aryl and heteroaryl preferably denote a mono-, bi- or tricyclic aromatic or heteroaromatic group with up to 25 C atoms that may also comprise fused rings and is optionally substituted with one or more groups selected from H, halogen, CN, NO$_2$, straight chain, branched or cyclic alkyl with 1 to 20 C-atoms, which is unsubstituted, mono- or poly-substituted by F, Cl, Br, I or CN, wherein one or more non-adjacent CH$_2$ groups are optionally replaced, in each case independently from one another, by —O—, —S—, —NH—, —NR°—, —SiR°R°°—, —CO—, —COO—, —OCO—, —OCO—O—, —S—CO—, —CO—S—, —CH=CH— or —C≡C— in such a manner that O and/or S atoms are not linked directly to one another, and P—Sp as defined in formula I.

Especially preferred aryl and heteroaryl groups are phenyl in which, in addition, one or more CH groups are optionally replaced by N, naphthalene, thiophene, thienothiophene, dithienothiophene, alkyl fluorene and oxazole, all of which can be unsubstituted, mono- or polysubstituted with L, wherein L is halogen or an alkyl, alkoxy, alkylcarbonyl or alkoxycarbonyl group with 1 to 12 C atoms, wherein one or more H atoms are optionally replaced by F or Cl.

Further preferred aryl and heteroaryl groups include five-membered heterocyclics like oxazole or isoxazole, N-substituted imidazole or pyrazole, thiazole or isothiazole, oxadiazole, N-substituted triazole, six-membered heterocyclics like pyridine, pyridazine, pyrimidine, pyrazine, triazine and tetrazine, heterocyclics with fused rings like benzoxazole, benzothiazole, benzimidazole, quinoline, isoquinoline, cinnoline, quinazoline, quinoxaline, phthalazine, benzothiadiazole, benzotriazole, benzotriazine, phenazine, phenanthridine, acridine, or condensed polycyclics like acenaphthene, phenanthrene, anthracene, fluoranthene, pyrene, perylene, rubrene, chrysene, naphthacene, coronene or triphenylene, all of which can be unsubstituted, mono- or polysubstituted with L as defined above.

—$CX^1$=$CX^2$— is preferably —CH=CH—, —CH=CF—, —CF=CH—, —CF=CF—, —CH=C(CN)— or —C(CN)=CH—.

If one of $R^1$ to $R^8$ is an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

Halogen is preferably F or Cl.

The polymerizable or reactive group P is preferably selected from $CH_2$=$CW^1$—COO—,

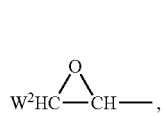 , 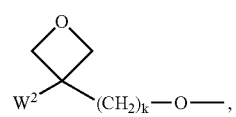 , $CH_2CW^2$—(O)$_{k1}$—, $CH_3$—CH=CH—O—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$—Phe—(O)$_{k2}$—, Phe—CH=CH—, HOOC—, OCN— and $W^4W^5W^6$Si—, with $W^1$ being H, Cl, CN, phenyl or alkyl with 1 to C-atoms, in particular H, Cl or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

Especially preferred groups P are $CH_2$=CH—COO—, $CH_2$=C($CH_3$)—COO—, $CH_2$=CH—, $CH_2$=CH—O— and

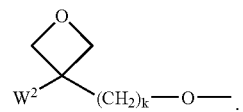

Very preferred are acrylate and oxetane groups. Oxetanes produce less shrinkage upon polymerization (cross-linking), which results in less stress development within films, leading to higher retention of ordering and fewer defects. Oxetane cross-linking also requires cationic initiator, which unlike free radical initiator is inert to oxygen.

As for the spacer group Sp, all groups can be used that are known for this purpose to those skilled in the art. The spacer group Sp is preferably a linear or branched alkylene group having 1 to 20 C atoms, in particular 1 to 12 C atoms, in which, in addition, one or more non-adjacent $CH_2$ groups are optionally replaced by —O—, —S—, —NH—, —N($CH_3$)—, —CO—, —O—CO—, —S—CO—, —O—COO—, —CO—S—, —CO—O—, —CH(halogen)—, —C(halogen)$_2$—, —CH(CN)—, —CH=CH— or —C≡C—, or a siloxane group.

Typical spacer groups are for example —($CH_2$)$_p$—, —($CH_2CH_2$O)$_r$—$CH_2CH_2$—, —$CH_2CH_2$—S—$CH_2CH_2$— or —$CH_2CH_2$—NH—$CH_2CH_2$— or —(Si$R^0R^{00}$—O)$_p$—, with p being an integer from 2 to 12, r being an integer from 1 to 3 and $R^0$ and $R^{00}$ having the meanings given in formula I.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene, for example.

Further preferred are compounds with one or two groups P—Sp—X wherein Sp and/or X is a single bond.

In case of compounds with two groups P—Sp—X, each of the two polymerizable groups P, the two spacer groups Sp, and the two linkage groups X can be identical or different.

SCLCPs obtained from the inventive compounds or mixtures by polymerization or copolymerization have a backbone that is formed by the polymerizable group P in formula I.

The compounds of formula I can be synthesized according to or in analogy to methods that are known to the skilled in the art and are described for example in T. Nozoe, T. Asao and M. Oda, *Bull. Chem. Soc. Jpn.* 1974, 47, 681; D. Balschukat and E. V. Dehmlow, *Chem. Ber.*, 1986, 119, 2272-2288 and T. Morita and K. Takase, *Bull. Chem. Soc. Jpn.*, 1982, 55, 1144-1152 and T. Nozoe, S. Seto and S. Matsumura, *Bull. Chem. Soc. Jpn.*, 1962, 35, 1990. Furthermore, they can be prepared according to or in analogy to the following reaction schemes.

Scheme 1
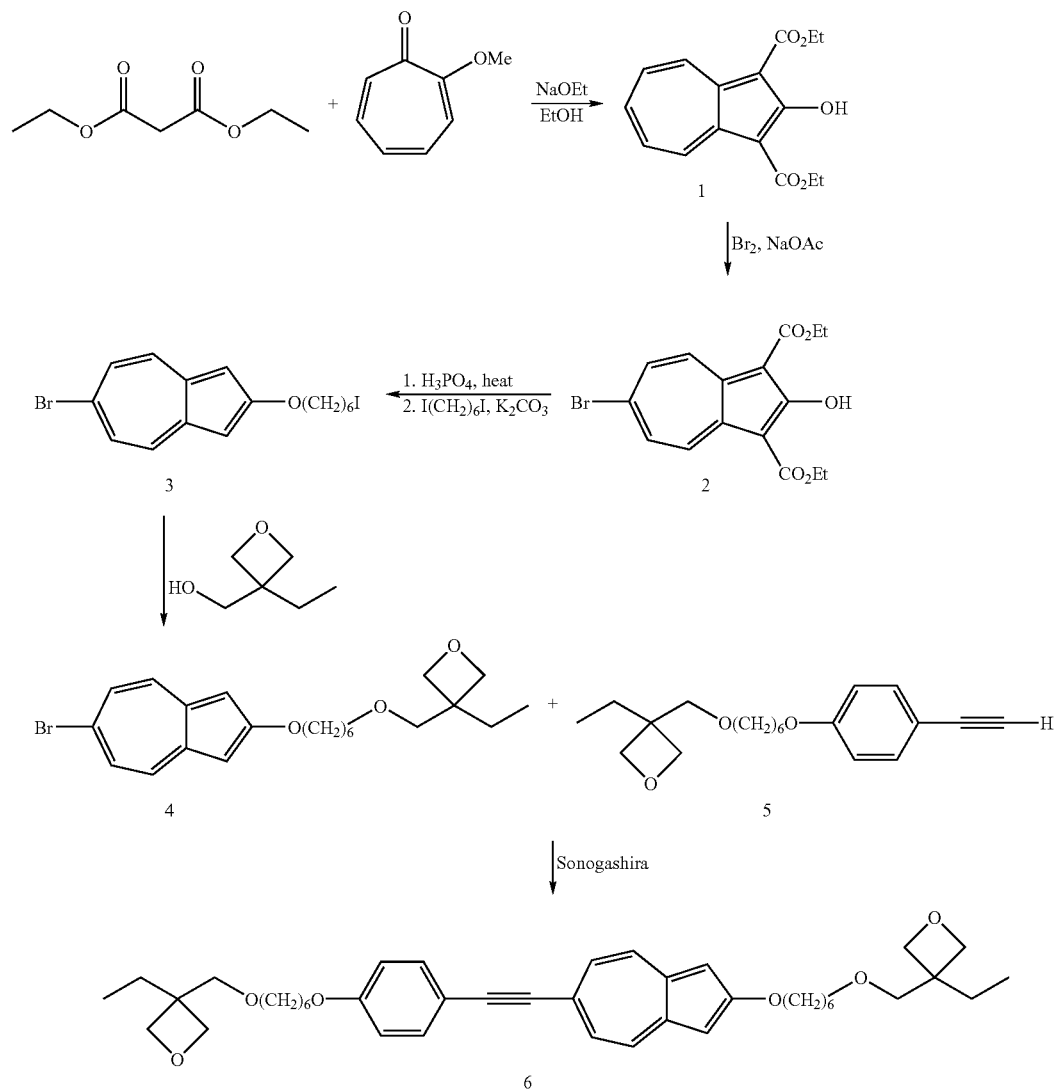
Scheme 2
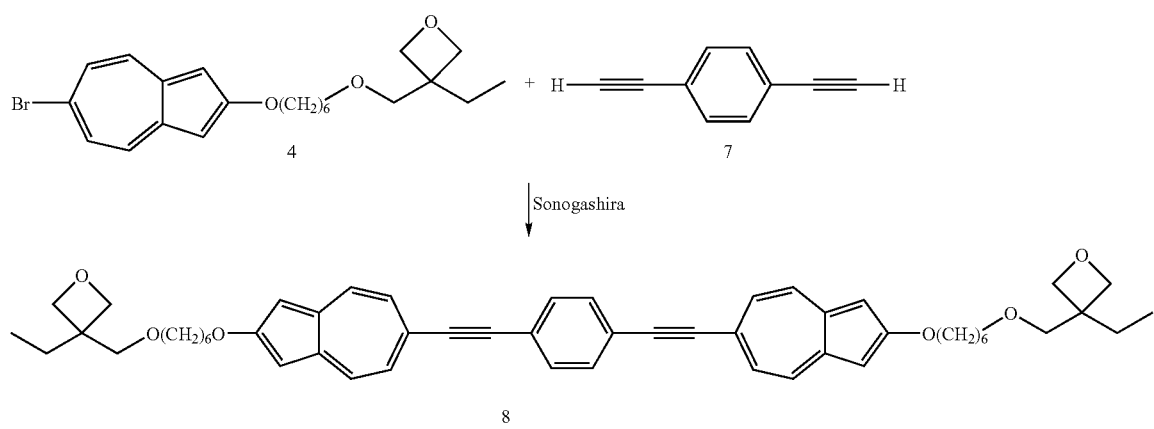

Scheme 3
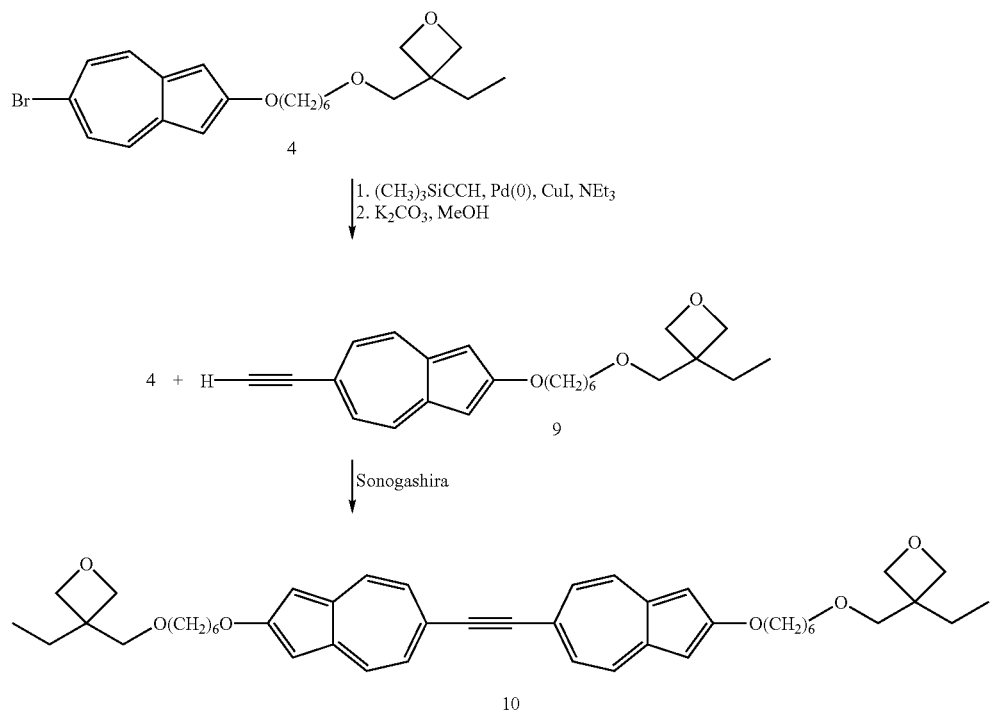
Scheme 4
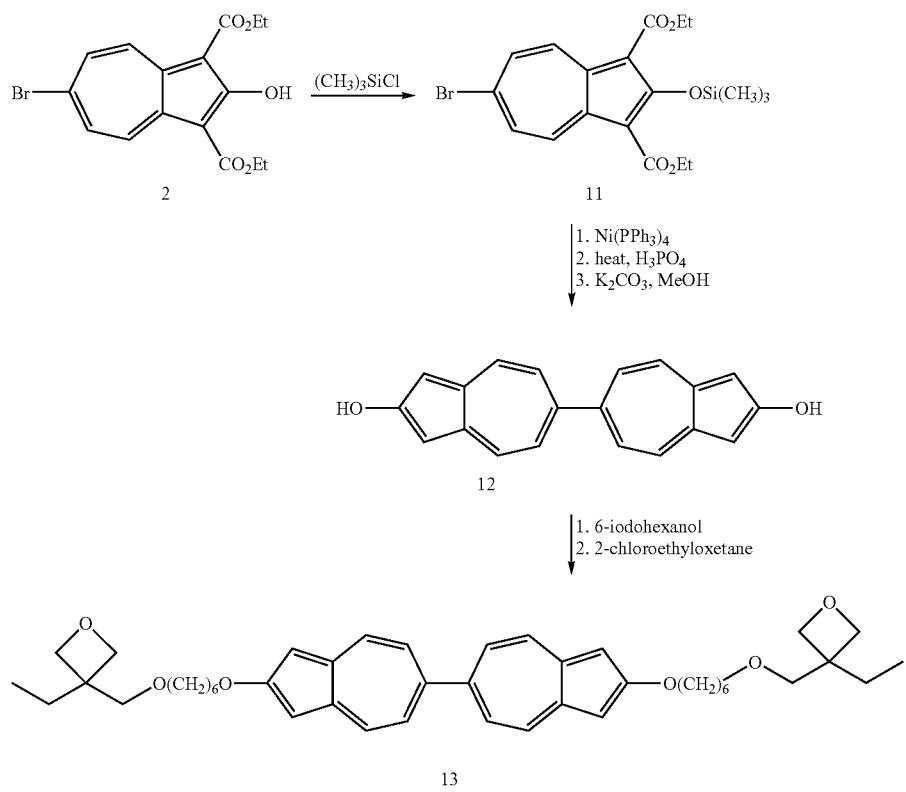

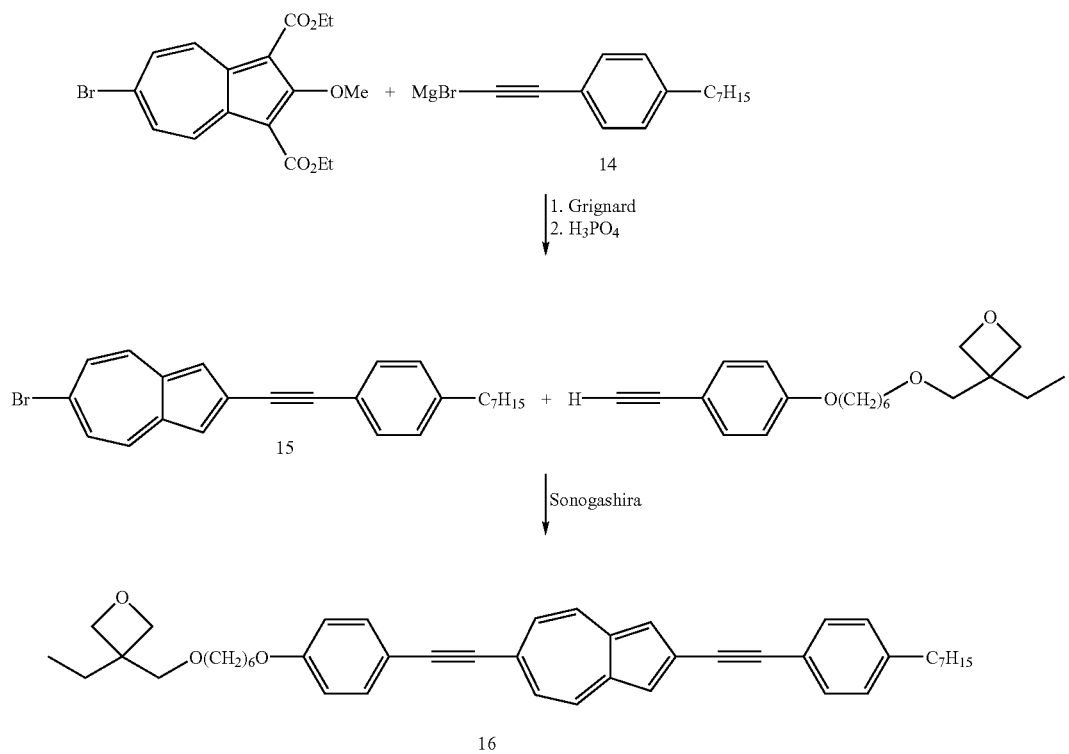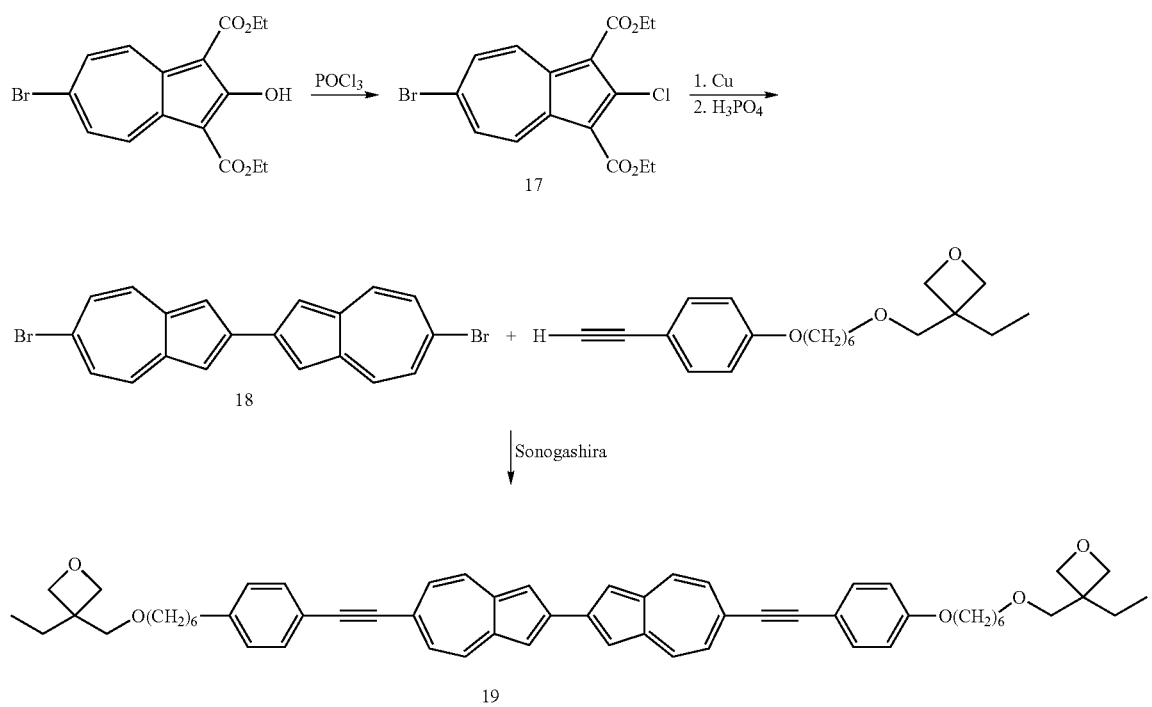

Scheme 7
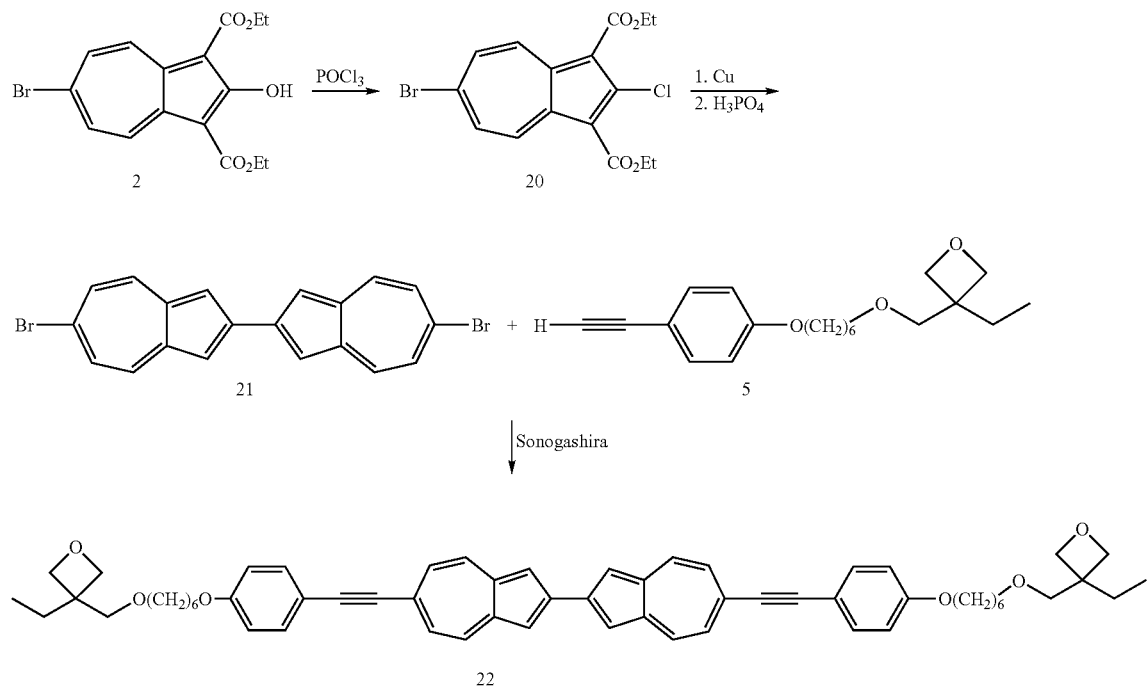
Scheme 8
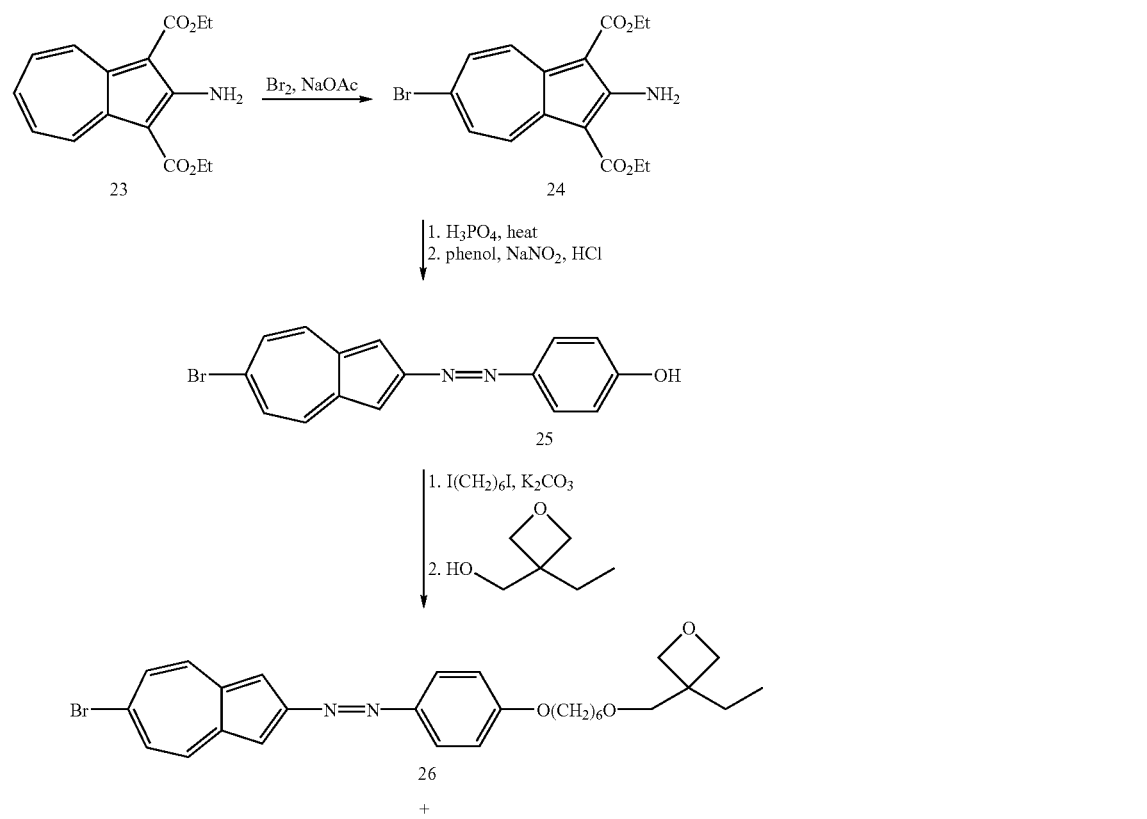

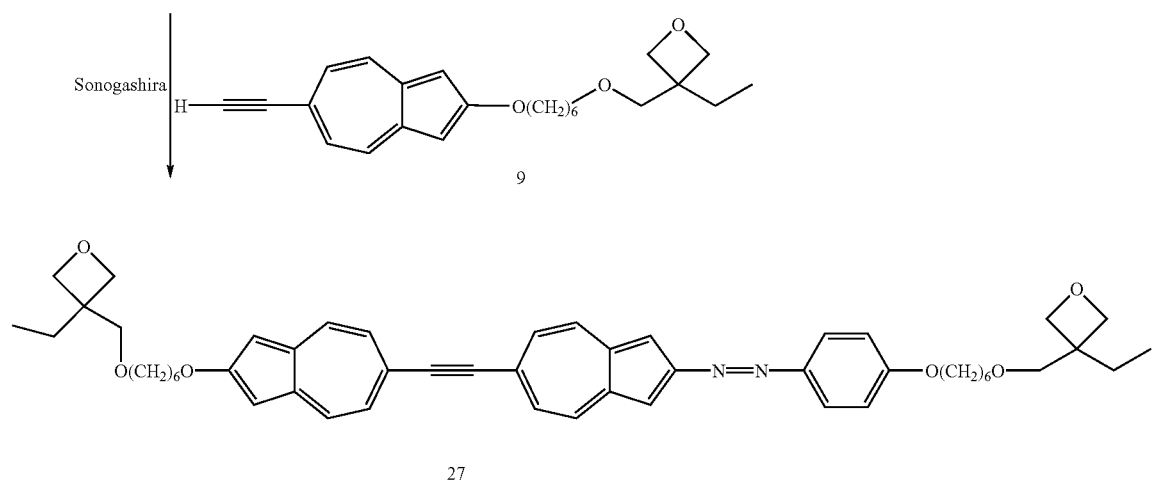
Scheme 9
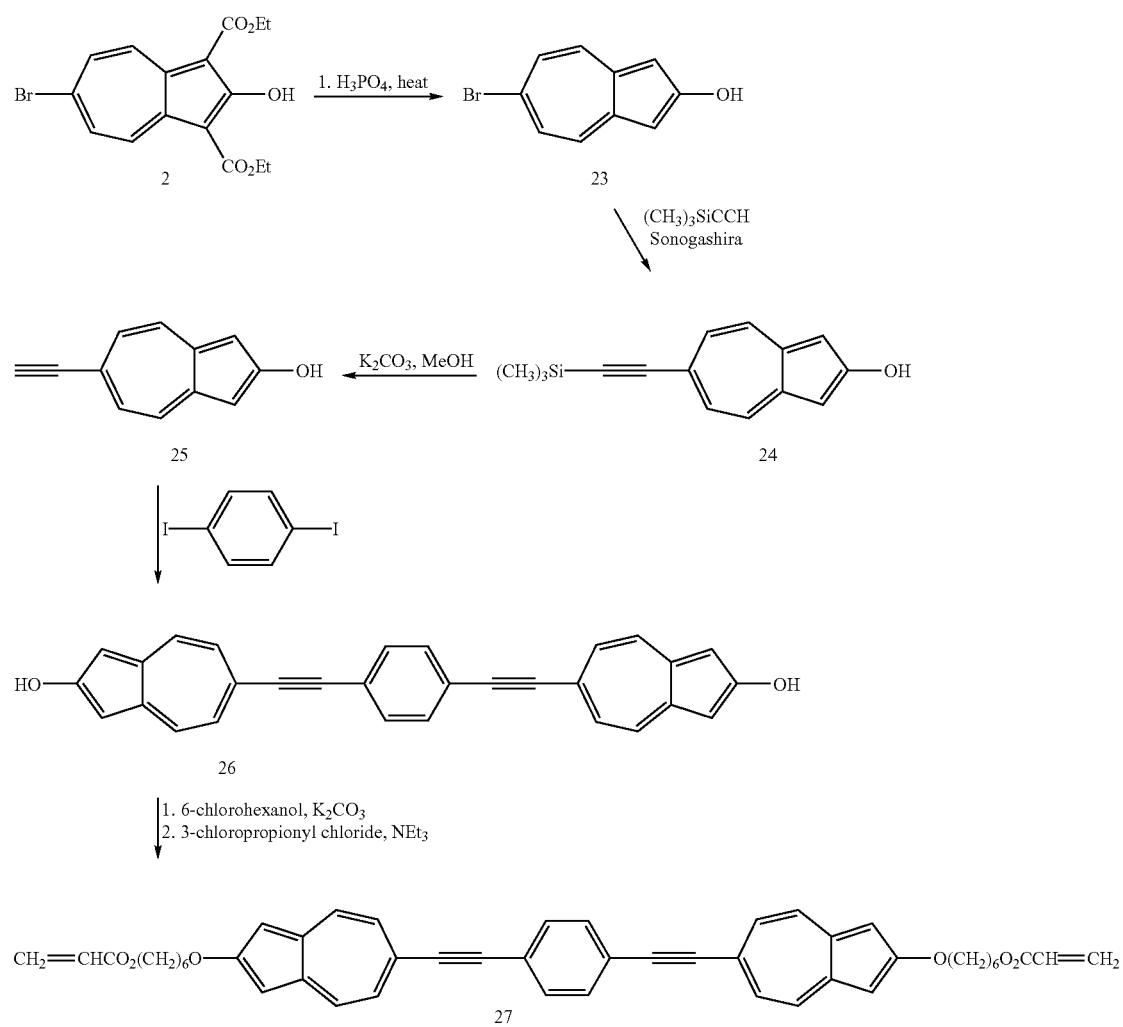

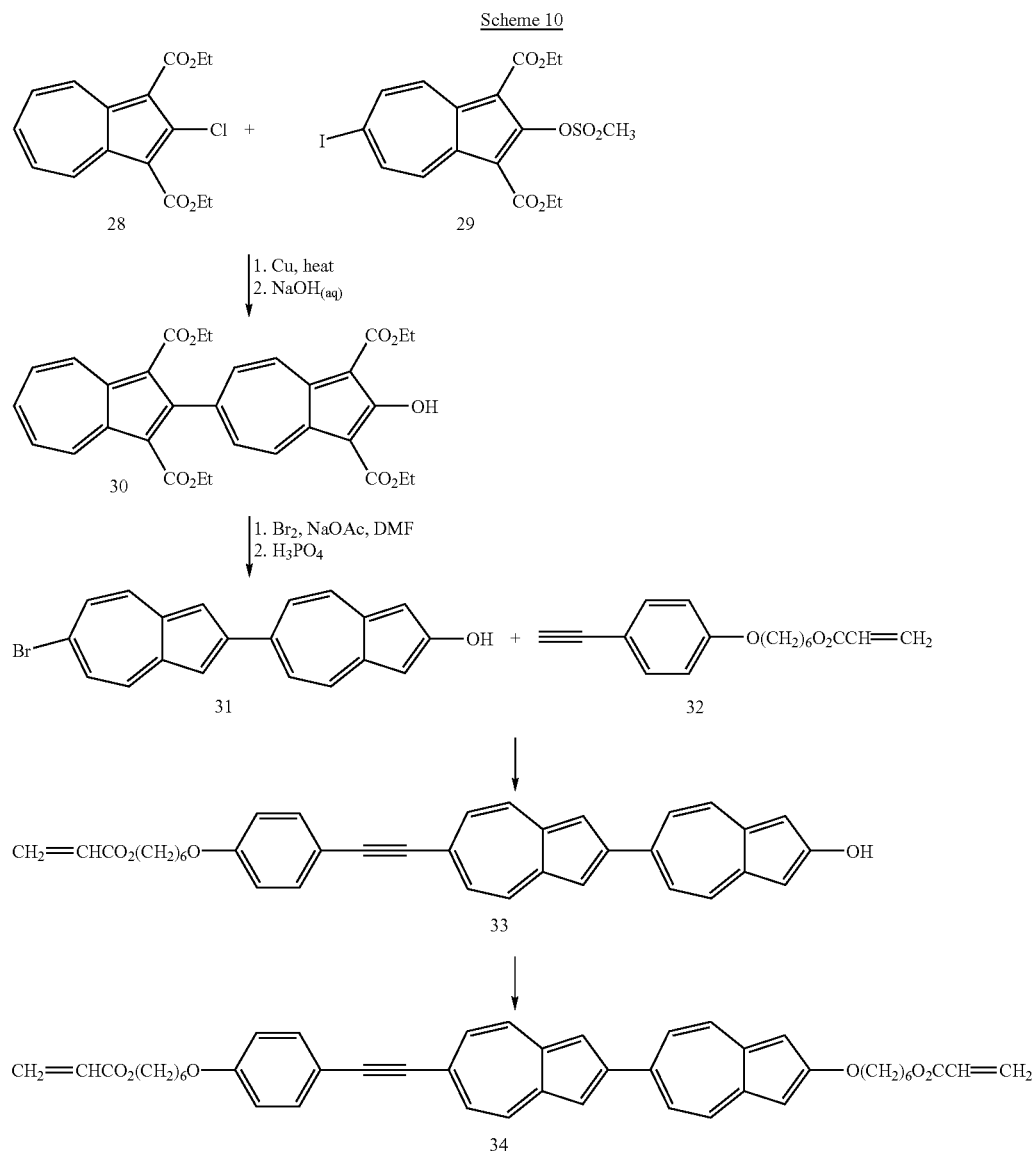

Scheme 10

A preferred embodiment of the present invention relates to reactive azulenes, in particular those of formula I, that are mesogenic or liquid crystalline. These materials are particularly useful as semiconductors or charge transport materials, as they can be aligned into uniform highly ordered orientation in their liquid crystal phase by known techniques, thus exhibiting a higher degree of order that leads to particularly high charge carrier mobility. The highly ordered liquid crystal state can be fixed by in situ polymerization or crosslinking via the groups P to yield polymer films with high charge carrier mobility and high thermal, mechanical and chemical stability.

It is also possible to copolymerize the azulenes according to the present invention with other polymerizable mesogenic or liquid crystal monomers that are known from prior art, in order to induce or enhance liquid crystal phase behavior.

Thus, another object of the invention is a polymerizable liquid crystal material comprising one or more reactive azulenes of the present invention as described above and below comprising at least one reactive group, and optionally comprising one or more further reactive compounds, wherein at least one of the reactive azulenes of the present invention and/or the further reactive compounds is mesogenic or liquid crystalline.

Particularly preferred are liquid crystal materials having a nematic and/or smectic phase. For FET applications smectic materials are especially preferred. For OLED applications nematic or smectic materials are especially preferred.

Another object of the present invention is an anisotropic polymer film with charge transport properties obtainable from a polymerizable liquid crystal material as defined above that is aligned in its liquid crystal phase into macroscopically uniform orientation and polymerized or crosslinked to fix the oriented state.

Polymerization is preferably carried out by in-situ polymerization of a coated layer of the material, preferably during fabrication of the electronic or optical device comprising the inventive semiconductor material. In case of liquid crystal materials, these are preferably aligned in their liquid crystal state into homeotropic orientation prior to polymerization, where the conjugated pi-electron systems are orthogonal to the direction of charge transport. This ensures that the intermolecular distances are minimized and hence then energy required to transport charge between molecules is minimized. The molecules are then polymerized or crosslinked to fix the uniform orientation of the liquid crystal state. Alignment and curing are carried out in the liquid crystal phase or mesophase of the material. This technique is known in the art and is generally described for example in D. J. Broer, et al., Angew. Makromol. Chem. 183, (1990), 45-66

Alignment of the liquid crystal material can be achieved for example by treatment of the substrate onto which the material is coated, by shearing the material during or after coating, by application of a magnetic or electric field to the coated material, or by the addition of surface-active compounds to the liquid crystal material. Reviews of alignment techniques are given for example by I. Sage in "Thermotropic Liquid Crystals", edited by G. W. Gray, John Wiley & Sons, 1987, pages 75-77, and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Polymerization takes place by exposure to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation at a non-absorbing wavelength. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

Polymerization is preferably carried out in the presence of an initiator absorbing at the wavelength of the actinic radiation. For example, when polymerizing by means of UV light, a photoinitiator can be used that decomposes under UV irradiation to produce free radicals or ions that start the polymerization reaction. When curing polymerizable materials with acrylate or methacrylate groups, preferably a radical photoinitiator is used, when curing polymerizable materials with vinyl, epoxide and oxetane groups, preferably a cationic photoinitiator is used. It is also possible to use a polymerization initiator that decomposes when heated to produce free radicals or ions that start the polymerization. As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable material can additionally comprise one or more other suitable components such as, for example, catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colorants, dyes or pigments.

Reactive azulenes comprising one or more groups P—Sp—X can also be copolymerized with polymerizable mesogenic compounds to induce, or, in case of mesogenic materials of formula I, enhance liquid crystal phase behavior. Polymerizable mesogenic compounds that are suitable as comonomers are known in prior art and disclosed for example in WO 93/22397; EP 0,261,712; DE 195,04,224; WO 95/22586 and WO 97/00600.

SCLCPs can be prepared from the polymerizable compounds or mixtures according to the invention by the methods described above, or by conventional polymerization techniques which are known to those skilled in the art, including for example radicalic, anionic or cationic chain polymerization, polyaddition or polycondensation. Polymerization can be carried out for example as polymerization in solution, without the need of coating and prior alignment, or polymerization in situ. It is also possible to form SCLCPs by grafting compounds according to the invention with a suitable reactive group, or mixtures thereof, to presynthesized isotropic or anisotropic polymer backbones in a polymeranaloguous reaction. For example, compounds with a terminal hydroxy group can be attached to polymer backbones with lateral carboxylic acid or ester groups, compounds with terminal isocyanate groups can be added to backbones with free hydroxy groups, compounds with terminal vinyl or vinyloxy groups can be added e.g. to polysiloxane backbones with Si—H groups. It is also possible to form SCLCPs by copolymerization or polymeranaloguous reaction from the inventive compounds together with conventional mesogenic or non mesogenic comonomers. Suitable comonomers are known to those skilled in the art. In principle it is possible to use all conventional comonomers known in the art that carry a reactive or polymerizable group capable of undergoing the desired polymer-forming reaction, like for example a polymerizable or reactive group P as defined above. Typical mesogenic comonomers are for example those mentioned in WO 93/22397; EP 0,261,712; DE 195,04,224; WO 95/22586 and WO 97/00600. Typical non mesogenic comonomers are for example alkyl mono- or diacrylates or alkyl mono- or dimethacrylates with alkyl groups of 1 to 20 C atoms, like methyl acrylate or methyl methacrylate, trimethylpropane trimethacrylate or pentaerythritol tetraacrylate.

The materials of the present invention are useful as optical, electronic and semiconductor materials, in particular as charge transport materials in field effect transistors (FETs) e.g. as components of integrated circuitry, ID tags or TFT applications. Alternatively, they may be used in organic light emitting diodes (OLEDs) in electroluminescent display applications or as backlight of e.g. liquid crystal displays, as photovoltaics or sensor materials, for electrophotographic recording, and for other semiconductor applications.

Especially the oligomers and polymers according to the invention show advantageous solubility properties which allow production processes using solutions of these compounds. Thus films, including layers and coatings, may be generated by low cost production techniques e.g. spin coating. Suitable solvents or solvent mixtures comprise alkanes and/or aromatics, especially their fluorinated derivatives.

The materials of the present invention are useful as optical, electronic and semiconductor materials, in particular as charge transport materials in field effect transistors (FETs), as photovoltaics or sensor materials, for electrophotographic recording, and for other semiconductor applications. Such FETs, where an organic semiconductive material is arranged as a film between a gate-dielectric and a drain and a source electrode, are generally known e.g. from U.S. Pat. No. 5,892,244, WO 00/79617, U.S. Pat. No. 5,998,804, and from the references cited in the background and prior art chapter and listed below. Due to the advantages, like low cost production using the solubility properties of the compounds according to the invention and thus the processibility of large surfaces, preferred applications of these FETs are such as integrated circuitry, TFT-displays and security applications.

In security applications, field effect transistors and other devices with semiconductive materials, like transistors or diodes, may be used for ID tags or security markings to authenticate and prevent counterfeiting of documents of value like banknotes, credit cards or ID cards, national ID documents, licenses or any product with money value, like stamps, tickets, shares, cheques etc.

Alternatively, the materials according to the invention may be used in organic light emitting devices or diodes (OLEDs), e.g. in display applications or as backlight of e.g. liquid crystal displays. Common OLEDs are realized using multilayer structures. An emission layer is generally sandwiched between one or more electron-transport and/or hole-transport layers. By applying an electric voltage electrons and holes as charge carriers move towards the emission layer where their recombination leads to the excitation and hence luminescence of the lumophor units contained in the emission layer. The inventive compounds, materials and films may be employed in one or more of the charge transport layers and/or in the emission layer, corresponding to their electrical and/or optical properties. Furthermore their use within the emission layer is especially advantageous, if the compounds, materials and films according to the invention show electroluminescent properties themselves or comprise electroluminescent groups or compounds. The selection, characterization as well as the processing of suitable monomeric, oligomeric and polymeric compounds or materials for the use in OLEDs is generally known by a person skilled in the art, see e. g. Meerholz, Synthetic Materials, 111–112, 2000, 31–34, Alcala, J. Appl. Phys., 88, 2000, 7124–7128 and the literature cited therein.

According to another use, the inventive compounds, materials or films, especially those which show photoluminescent properties, may be employed as materials of light sources, e.g. of display devices such as described in EP 0 889 350 A1 or by C. Weder et al., Science, 279, 1998, 835–837.

A further aspect of the invention relates to both the oxidized and reduced form of the compounds and materials according to this invention. Either loss or gain of electrons results in formation of a highly delocalized ionic form, which is of high conductivity. This can occur on exposure to common dopants. Suitable dopants and methods of doping are known to those skilled in the art, e.g. from EP 0 528662, U.S. Pat. No. 5,198,153 or WO 96/21659.

The doping process typically implies treatment of the semiconductor material with an oxidating or reducing agent in a redox reaction to form delocalized ionic centers in the material, with the corresponding counterions derived from the applied dopants. Suitable doping methods comprise for example exposure to a doping vapor in the atmospheric pressure or at a reduced pressure, electrochemical doping in a solution containing a dopant, bringing a dopant into contact with the semiconductor material to be thermally diffused, and ion-implantantion of the dopant into the semiconductor material.

When electrons are used as carriers, suitable dopants are for example halogens (e.g. $I_2$, $Cl_2$, $Br_2$, ICl, $ICl_3$, IBr and IF), Lewis acids (e.g. $PF_5$, $AsF_5$, $SbF_5$, $BF_3$, $BCl_3$, $SbCl_5$, $BBr_3$ and $SO_3$), protonic acids, organic acids, or amino acids (e.g. HF, HCl, $HNO_3$, $H_2SO_4$, $HClO_4$, $FSO_3H$ and $ClSO_3H$), transition metal compounds (e.g. $FeCl_3$, FeOCl, $Fe(ClO_4)_3$, $Fe(4-CH_3C_6H_4SO_3)_3$, $TiCl_4$, $ZrCl_4$, $HfCl_4$, $NbF_5$, $NbCl_5$, $TaCl_5$, $MoF_5$, $MoCl_5$, $WF_5$, $WCl_6$, $UF_6$ and $LnCl_3$ (wherein Ln is a lanthanoid), anions (e.g. $Cl^-$, $Br^-$, $I^-$, $I_3^-$, $HSO_4^-$, $SO_4^{2-}$, $NO_3^-$, $ClO_4^-$, $BF_4^-$, $PF_6^-$, $AsF_6^-$, $SbF_6^-$, $FeCl_4^-$, $Fe(CN)_6^{3-}$, and anions of various sulfonic acids, such as aryl-$SO_3^-$). When holes are used as carriers, examples of dopants are cations (e.g. $H^+$, $Li^+$, $Na^+$, $K^+$, $Rb^+$ and $Cs^+$), alkali metals (e.g., Li, Na, K, Rb, and Cs), alkaline-earth metals (e.g., Ca, Sr, and Ba), $O_2$, $XeOF_4$, $(NO_2^+)$ $(SbF_6^-)$, $(NO_2^+)$ $(SbCl_6^-)$, $(NO_2^+)$ $(BF_4^-)$, $AgClO_4$, $H_2IrCl_6$, $La(NO_3)_3.6H_2O$, $FSO_2OOSO_2F$, Eu, acetylcholine, $R_4N^+$, (R is an alkyl group), $R_4P^+$ (R is an alkyl group), $R_6As^+$ (R is an alkyl group), and $R_3S^+$ (R is an alkyl group).

The conducting form of the compounds and materials of the present invention can be used as an organic "metal" in applications, for example, but not limited to, charge injection layers and ITO planarising layers in organic light emitting diode applications, films for flat panel displays and touch screens, antistatic films, printed conductive substrates, patterns or tracts in electronic applications such as printed circuit boards and condensers.

The entire disclosure of all applications, patents and publications, cited herein and of corresponding European Patent application No. 01129217.4, filed Dec. 10, 2001, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reactive mesogenic azulene compound of the formula I

wherein

P is $CH_2=CW^1-COO-$,

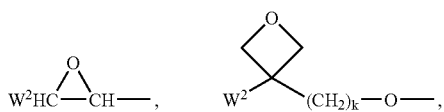

$CH_2=CW^2-(O)_{k1}-$, $CH_3-CH=CH-O-$, $HO-CW^2W^3-$, $HS-CW^2W^3-$, $HW^2N-$, $HO-CW^2W^3-NH-$, $CH_2=CW^1-CO-NH-$, $CH_2=-CH-(COO)_{k1}-Phe-(O)_{k2}-$, Phe—CH=CH—, HOOC—, OCN— and $W^4W^5W^6$ Si—, with $W^1$ being H, Cl, CN, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbo-nylalkyl with 1 to 5 C-atoms, Phe being 1,4-phenylene and $k_1$ and $k_2$ being independently of each other 0 or 1, $S_p$ is a single bond or a linear or branched alkylene group having 1 to 20 C atoms, in which one or more non-adjacent $CH_2$ groups are optionally replaced by —O—, —S—, —NH—, —N(CH$_3$)—, —CO—, —O—CO—, —S—CO—, —O—COO—, —CO—S—, —CO—O—, —CH(halogen)—, —C(halogen)$_2$—, —CH(CN)—, —CH=CH— or —C≡C—, or a siloxane group, $R^1$ is H, halogen, CN, NO$_2$, an aliphatic, alicyclic or aromatic group with up to 40 C atoms that optionally comprises one or more hetero atoms and one or more fused rings, or a group P—Sp—, and T is a mesogenic group of the formula II $$-Z^1-(A^1-Z^2)_m-(T^1-Z^3)_n-(A^2-Z^4)_o-$$  II wherein $A^1$ and $^2$ are independently of each other an aromatic or heteroaromatic group with up to 18 C atoms which is unsubstituted, mono- or polysubstituted with $R^1$, and $A^1$ may also denote $T^1$, $Z^1$ to $Z^4$ are independently of each other —O—, —S—, —CO—, —COO—, —OCO—, —O—COO—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=CR$^0$—, —CX$^1$=CX$^2$—, —C≡C—, —CH=CH—COO—, —OCO—CH=CH— or a single bond, $X^1$ and $X^2$ are independently of each other H, F, Cl or CN, $T^2$ is a group consisting of 1,2,3, or 4 azulene groups which are optionally substituted by $R^2$, $R^2$ is H, halogen, CN, NO$_2$, straight chain, branched or cyclic alkyl with 1 to 20 C-atoms, which is unsubstituted, mono- or poly-substituted by F, Cl, Br, I or CN, wherein one or more non-adjacent $CH_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CH=CH— or —C≡C—in such a manner that O and/or S atoms are not linked directly to one another, or denotes an aromatic or heteroaromatic group or a group P—S$_p$, $R^0$ and $R^{00}$ are independently of each other H or alkyl with 1 to 12 C-atoms, m and o are independently of each other 0, 1, 2 or 3, and
n is 1, 2 or 3.

2. A reactive mesogenic azulene compound of one of the following formulae:

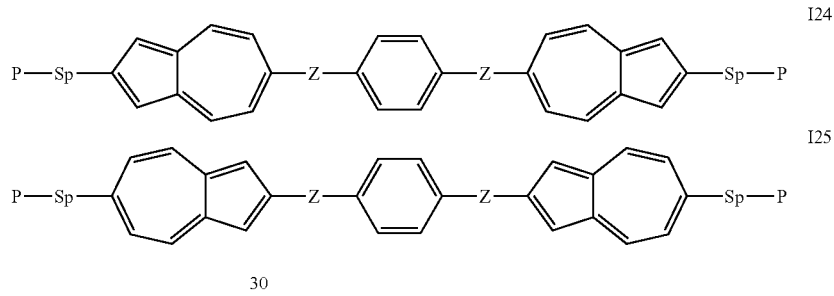

wherein

P is $CH_2=CW^1-COO-$,

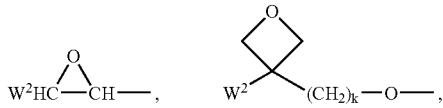

$CH_2=CW^2-(O)_{k1}-$, $CH_3-CH=CH-O-$, $HO-CW^2W^3-$, $HS-CW^2W^3-$, $HW^2N-$, $HO-CW^2W^3-NH-$, $CH_2=CW^1-CO-NH-$, $-CH_2CH-(COO)k_{K1-Phe-(O)k2}-$, Phe—CH=CH—, HOOC—, OCN—and $W^4W^5W^6$Si-, with $W^1$ being H, Cl, CN, phenyl or alkyl with 1 to 5 C-atoms, $W^2$ and $W^3$ being independently of each other H or alkyl with 1 to 5 C-atoms, $W^4$, $W^5$ and w$^6$ being independently of each other Cl, oxaalkyl or oxacarbonylalkyl with 1 to 5 C— atoms, Phe being 1,4-phenylene and $k_1$ and $k_2$ being independently of each other 0 or 1, $S_p$ is a linear or branched alkylene group having 1 to 20 C atoms, in which one or more non-adjacent $CH_2$ groups are optionally replaced by —O—, —S—, —NH—, —N(CH$_3$)—, —CO—, —O—CO—, —S—CO—, —O—COO—, —CO—S—, —CO—O—, —CH(halogen)—, —C(halogen)$_2$—, —CH(CN)—, —CH=CH— or —C≡C—, or a siloxane group, provided that the first group adjacent to the azulene ring is —O—, and z are independently of each other —O—, —S—, —CO—, —COO—, —OCO—, —O—COO—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=N—, —N=CH—, —N=N—, —CH=CR⁰—, —CX¹=CX²—, —C≡C—, —CH=CH—COO—, or —OCO—CH=CH—.

3. A reactive mesogenic azulene compound according to claim 1, wherein T¹ is of one of the following subformulae:

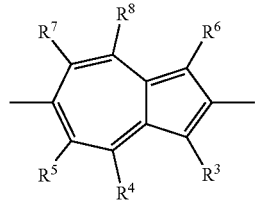
IIIa

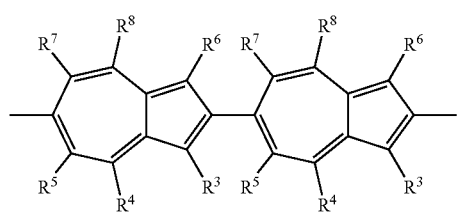
IIIb

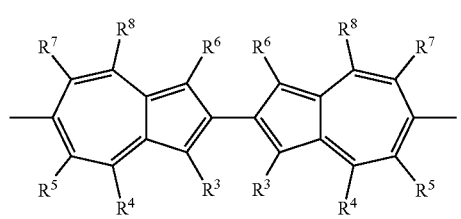
IIIc

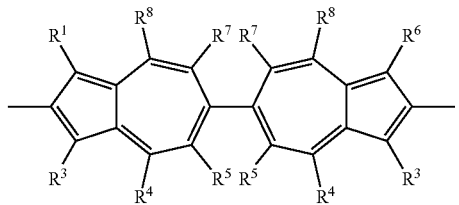
IIId wherein R³ to R⁸ have independently of each other one of the meanings of R² in formula II.

4. A reactive mesogenic azulene compound according to claim 1, wherein A¹ and A² are selected from the group consisting of 1,4-phenylene, 1,4-cyclohexa-1,3-diene, 1,4-cyclohexenylene in which one or more CH groups are optionally replaced by N and one or two non-adjacent CH₂ groups are optionally replaced by O and/or S; thiophene-2,5-diyl, thienothiophene-2,5-diyl, dithienothiophene-2,6-diyl, 1,4-bicyclo-(2,2,2)-octylene, naphthalene-2,6-diyl, furan-2,5-diyl, and indane-2,5-diyl; wherein all of the above are unsubstituted, mono- or polysubstituted by L, with L being halogen, CN, SCN, NO₂, SF₅ or an alkyl, alkoxy, alkylcarbonyl or alkoxycarbonyl group with 1 to 4 C atoms, wherein one or more H atoms are optionally substituted with F or Cl.

5. A reactive mesogenic azulene compound according to claim 1, wherein R¹ is H, F, Cl or straight chain, branched or cyclic alkyl with 1 to 20 C-atoms, which is unsubstituted, mono- or poly-substituted by F, Cl, Br, I or CN, wherein one or more non-adjacent CH₂ groups are optionally replaced, in each case independently from one another, by —O—, —S—, —NH—, —NR⁰—, —SiR⁰R⁰⁰—, —CO—, —COO—, —OCO—, —OCO—O—, —S—CO—, —CO—S—, —CH=CH— or —C≡C— in such a manner that 0 and/or S atoms are not linked directly to one another, or an aromatic or heteroaromatic group.

6. A reactive mesogenic azulene compound according to claim 1, which is of one of the following formulae:

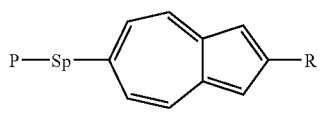
I1

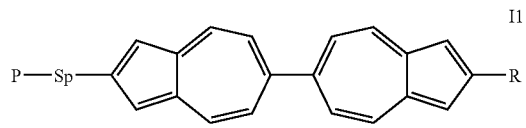
I2

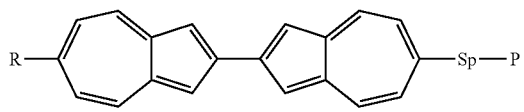
I3

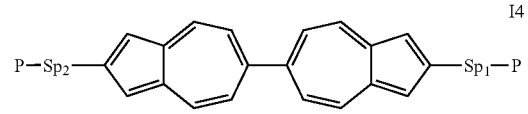
I4

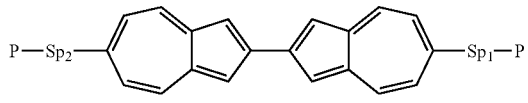
I5

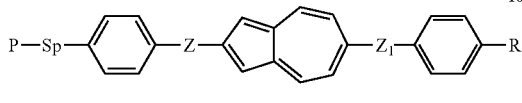
I6

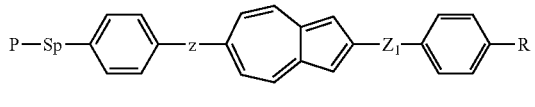
I7

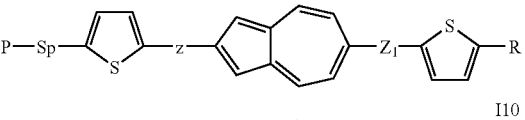
I8

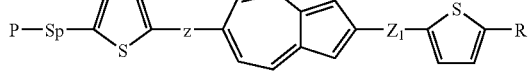
I9

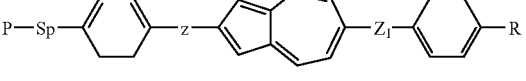
I10

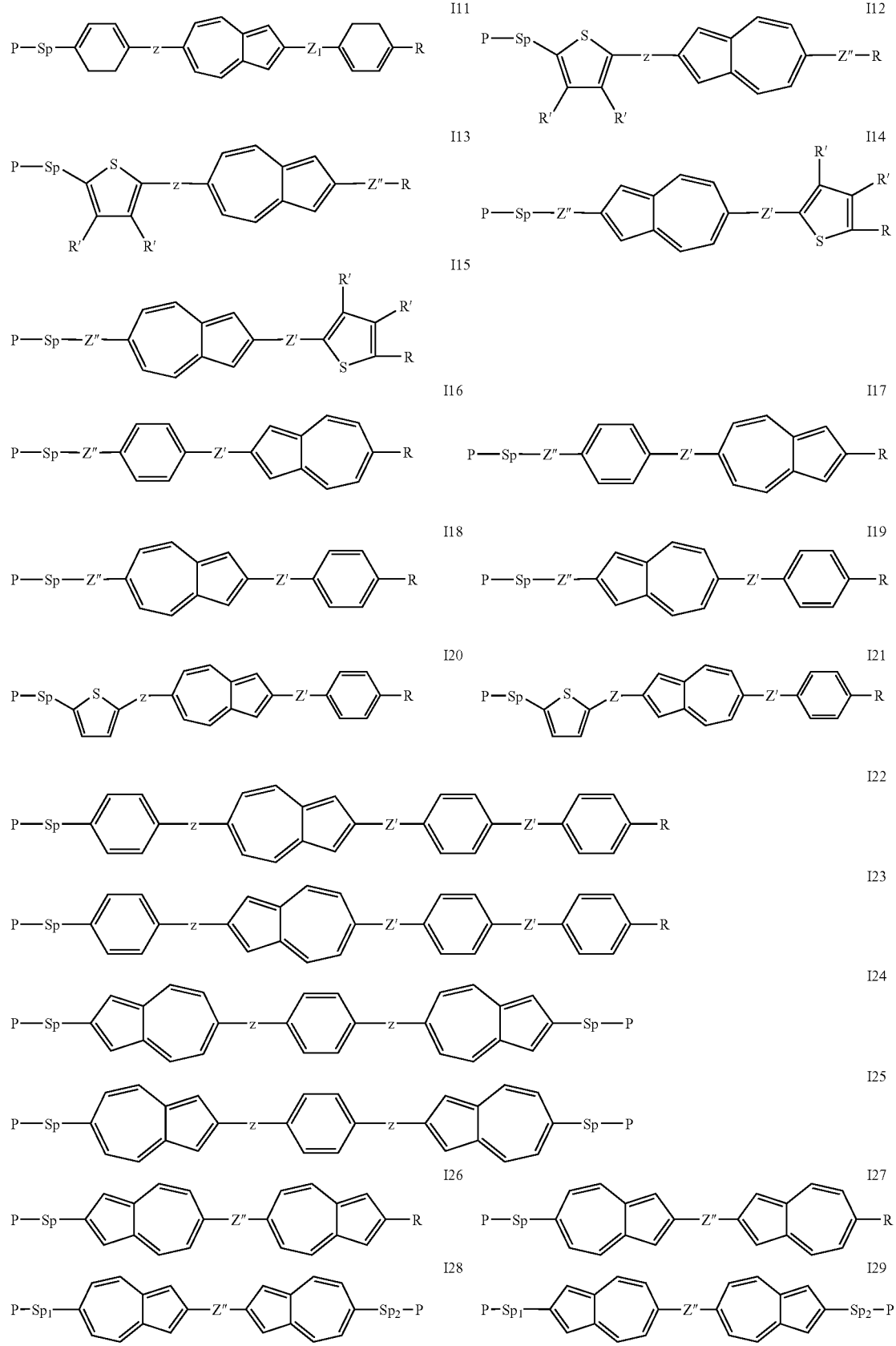

wherein P, $S_p$ and n have the meanings of formula I, $S_p^1$ and $S_p^2$ are different groups $S_p$ as defined in formula I, z, Z' and Z" are independently of each other —O—, —S—, —CO—, —COO—, —OCO—, —O—COO—, —CO—NR$^0$—, —NR$^0$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH═N—, —N═CH—, —N═N—, —CH═CR$^0$—, —CX$^1$CX$^2$—, —C≡C—, —CH═CH—COO—, —OCO—CH═CH— or a single bond, R has in each case independently one of the meanings of $R^1$ of formula I, $R^1$ is in each case independently from one another, by —O—, —S—, —NH—, —NR$^0$—, —SiR$^0$R$^{00}$—, —CO—, —COO—, —OCO—, —OCO—O—, —S—CO—, —CO—S—, —CH═CH— or —C≡C— in such a manner that O and/or S atoms are not linked directly to one another, or denotes an aromatic or heteroaromatic group or P—Sp as defined in formula I, wherein the azulene group is optionally mono- to polysubstituted by $R^2$ as defined in formula II, and wherein in formulae 16 to 129 the azulene-2,6-diyl groups are optionally replaced, independently in each occurrence, by [2,6']-bisazulene-6,2'-diyl, [2,2']-bisazulene-6,6'-diyl or [6,6']-bisazulene-2,2'-diyl, all of which are optionally mono- or polysubstituted by $R^2$ wherein $R^2$ is H, halogen, CN, NO$_2$, straight chain, branched or cyclic alkyl with 1 to 20 C atoms, which is unsubstituted, mono- or poly-substituted by F, Cl, Br, I or CN, wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CH═CH— or —C≡C— in such a manner that O and/or S atoms are not linked directly to one another, or denotes an aromatic or heteroaromatic group or P—$S_p$ as defined in formula I.

7. A reactive mesogenic azulene compound according to claim 1, which has mesogenic or liquid crystalline properties.

* * * * *

UNITED STATES PATENT AND TRADEMARK OFFICE
CERTIFICATE OF CORRECTION

PATENT NO. : 7,115,755 B2
APPLICATION NO. : 10/314162
DATED : October 3, 2006
INVENTOR(S) : Louise Diane Farrand It is certified that error appears in the above-identified patent and that said Letters Patent is hereby corrected as shown below:

Column 31, line 11, reads "$CH_2=-CH-(COO)_{k1}-Phe-(O)_{k2}-,$" should read -- $CH_2=CH-(COO)_{k1}-Phe-(O)_{k2}-,$ --
Column 31, line 34, reads "$S_p$" should read -- Sp --
Column 31, line 48, reads "$A^1$ and $^2$" should read -- $A^1$ and $A^2$ --
Column 31, line 64, reads "$T^2$" should read -- $T^1$ --
Column 32, line 7, reads "-C=C-in" should read -- -C≡C- in --
Column 32, line 10, reads "P- $S_p$," should read -- P-Sp, --
Column 32, line 44, reads "$-CH_2CH-(COO)k_{K1-Phe-(O)k2}-,$" should read -- $-CH_2CH-(COO)_{k1}-Phe-(O)_{k2}-,$ --
Column 32, line 45, reads "OCN-and" should read -- OCN- and --
Column 32, line 53, reads "$S_p$" should read -- Sp --
Column 34, line 38, reads "that 0 and/or S" should read -- that O and/or S --
Column 34, formula "I1" should read -- I2 --
Column 34, in formula I6, the first "Z" should read -- z --
Column 37, line 1, reads "$S_p$" should read -- Sp --
Column 37, line 2, reads "$S_p^1$ and $S_p^2$ are different groups $S_p$" should read -- $Sp^1$ and $Sp^2$ are different groups Sp --
Column 37, line 11, reads "$-CX^1CX^2-,$" should read -- $-CX^1=CX^2-,$ --
Column 37, line 19, reads "-CH=CH-or" should read -- -CH=CH- or --
Column 38, line 15, reads "-CH=CH-or" should read -- -CH=CH- or --
Column 38, line 17, reads "P- $S_p$" should read -- P-Sp --

Signed and Sealed this

Twentieth Day of March, 2007

JON W. DUDAS
*Director of the United States Patent and Trademark Office*